Oct. 11, 1960     L. M. FORBUSH ET AL     2,955,426
POWER ACTUATOR FOR HYDRAULIC BRAKES
Filed Sept. 16, 1957     3 Sheets-Sheet 1

INVENTORS
LOTHROP M. FORBUSH
BY ROLAND V. HUTCHINSON
D. L. Staley
ATTORNEY

Oct. 11, 1960  L. M. FORBUSH ET AL  2,955,426
POWER ACTUATOR FOR HYDRAULIC BRAKES
Filed Sept. 16, 1957  3 Sheets-Sheet 2

INVENTORS
LOTHROP M. FORBUSH
BY ROLAND V. HUTCHINSON

ATTORNEY

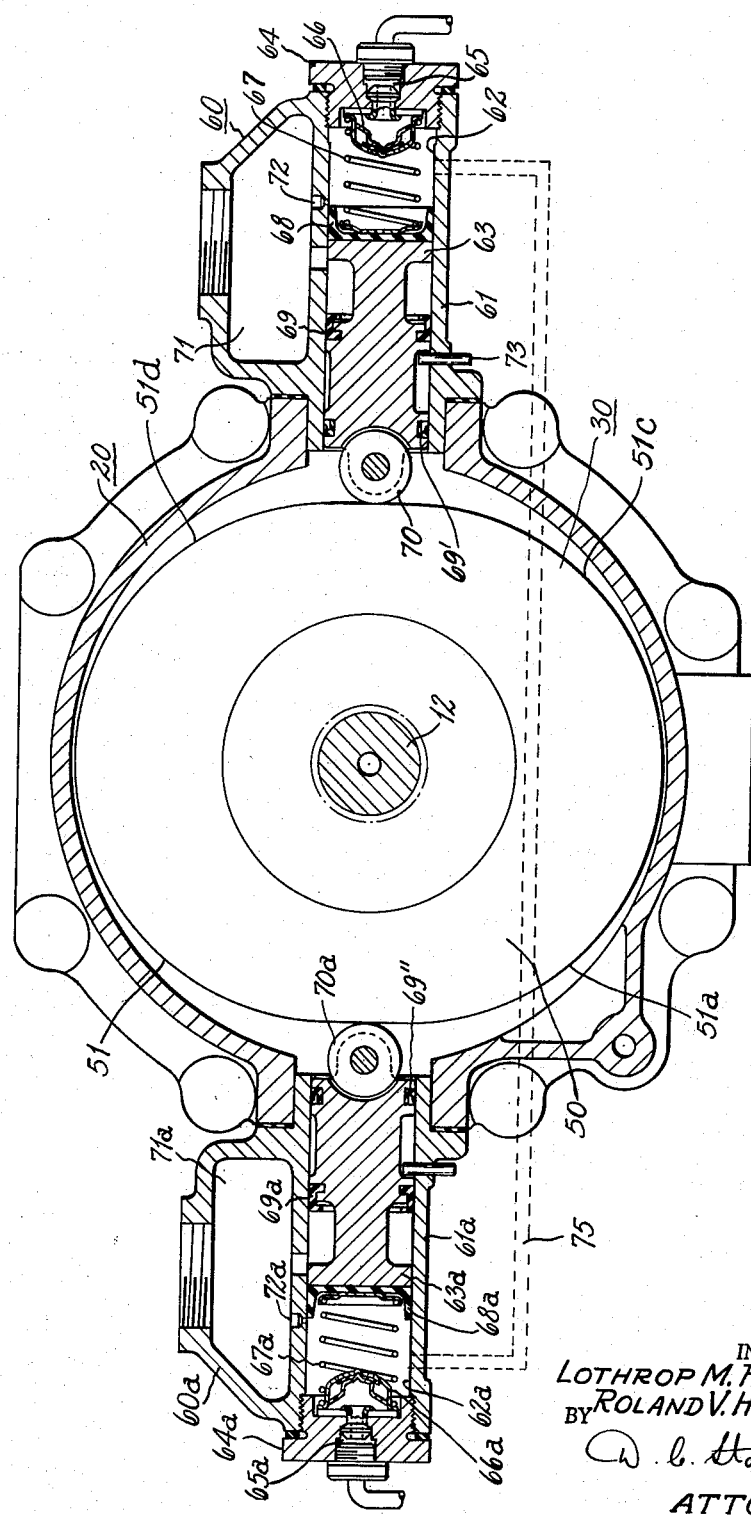

United States Patent Office 2,955,426
Patented Oct. 11, 1960

2,955,426
POWER ACTUATOR FOR HYDRAULIC BRAKES

Lothrop M. Forbush and Roland V. Hutchinson, Birmingham, Mich., assignors to General Motors Corporation, Detroit, Mich., a corporation of Delaware Filed Sept. 16, 1957, Ser. No. 684,336

5 Claims. (Cl. 60—54.6)

This invention relates to a power unit adapted for power operation of the brakes of a motor vehicle, and is particularly adapted for operation by the propeller shaft or drive shaft of the vehicle that rotates any time the vehicle is in motion whereby to insure a power source for operation of the hydraulic brakes of the vehicle at any time the vehicle is in motion regardless of whether or not the engine of the vehicle is operating.

In this invention the power unit is applied to the rear side of the gear change or hydro-kinetic transmission of the motor vehicle with the drive shaft of the transmission extending through the power unit, the transmission drive shaft being coupled through a universal connection with the propeller shaft of the vehicle that in turn is connected with the differential whereby any time the vehicle is in motion the propeller shaft will rotate and thereby cause the power shaft of the power unit to rotate to make a source of power available for operation of the power unit.

The output shaft of the vehicle transmission, whether it be a transmission of the manually operated gear change type or one of the automatic or semi-automatic hydro-kinetic transmissions, supports the driving discs of a clutch arrangement for the power unit. The driven discs of the clutch arrangement are supported by a reversibly rotatable carrier which in turn carries a cam that is adapted to operate the piston of a master cylinder upon rotation of the carrier whereby fluid is displaced from the master cylinder into the hydraulic brake system for the vehicle. The clutch device is operated by an actuating member that is connected with the carrier for the driven discs so that the actuating member rotates with the carrier in either direction of rotation. The actuating member is connected with a manually operated lever which moves the actuating member axially relative to the discs to cause engagement of the driving and driven discs for operation of the carrier and cam. A centering device is provided for the driven disc carrier and the actuating member for the discs to normally position the driven disc carrier and the cam thereon in a neutral position from which the cam and driven disc carrier can be rotated in either direction, depending upon the direction of rotation of the output power shaft of the transmission partition as applied thereto as a result of the power shaft being driven either by the propeller shaft of the vehicle or the engine.

An object of the invention is to provide an improved mechanical structure of a power unit for operation of the hydraulic brakes of a motor vehicle with the power unit being power driven from the propeller shaft or drive shaft of the vehicle to make a source of power available for operation of the brakes at any time the vehicle is in motion whether or not it is being driven by the vehicle engine.

Further objects and advantages of the present invention will be apparent from the following description, reference being had to the accompanying drawings wherein a preferred form of the invention is clearly shown.

Figure 3 is a transverse cross sectional view taken substantially along line 3—3 of Figure 1.

Figure 1:
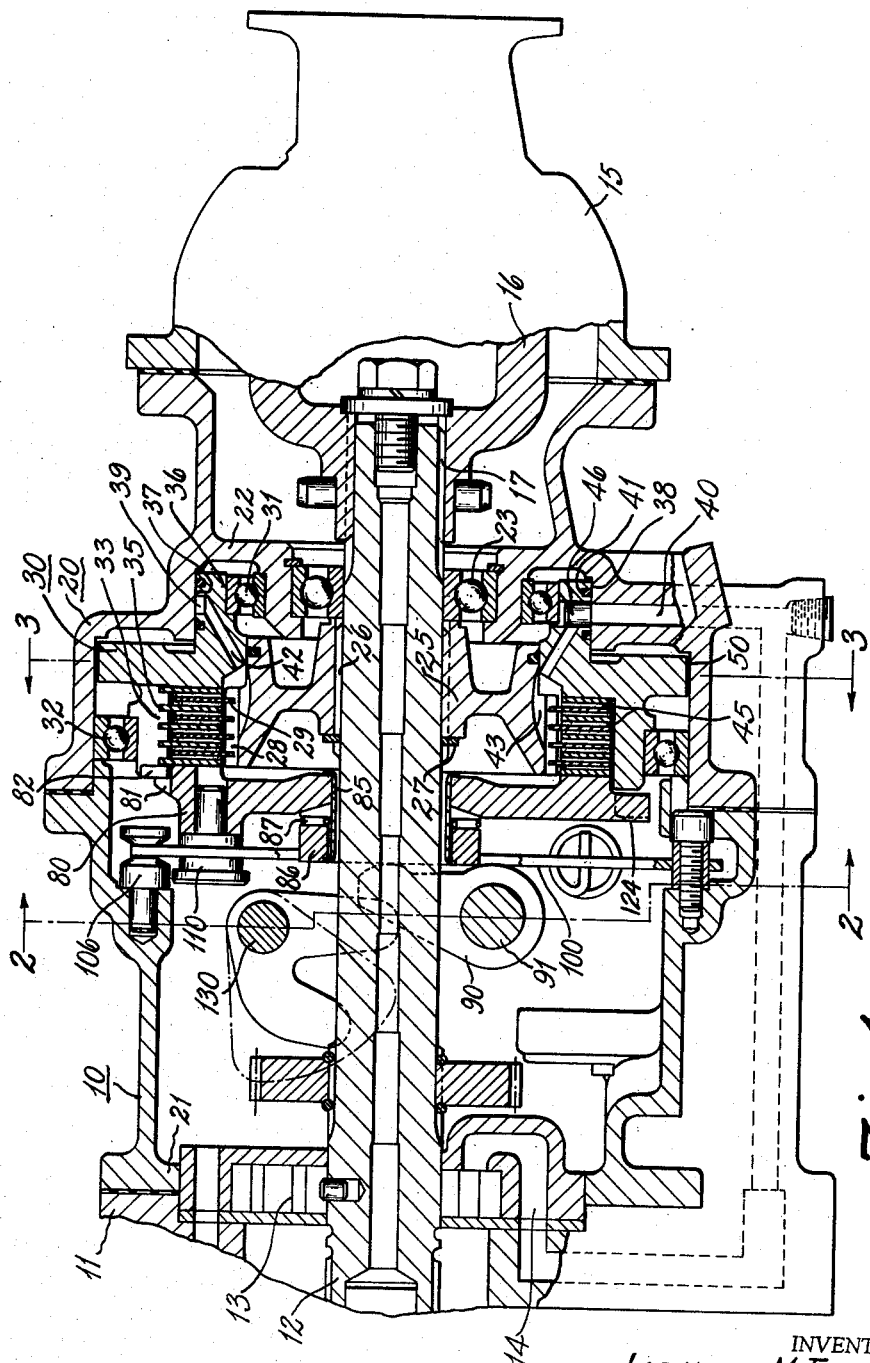
Figure 1 is a vertical cross sectional view of the power unit illustrating its position between the transmission of the vehicle and the universal joint of the propeller shaft.

In this invention the power unit 10 that is adapted for operation of the hydraulic brakes of a motor vehicle is supported on the rear end of a transmission housing 11 of any of the conventional variety used currently in motor vehicles. If the transmission 11 is one of the automatic hydro-kinetic types there is usually provided an oil pump that is conventionally termed a "rear pump" driven from the output shaft of the transmission so that the "rear pump" will be driven for circulation of oil in the transmission at any time the vehicle is in motion since the output shaft of the transmission is directly connected with the propeller shaft and it in turn through the differential with the rear wheels.

Thus the output shaft 12 of the transmission 11 carries a liquid pump 13 that is driven thereby for circulation of oil within the transmission 11 at any time the shaft 12 is rotated. This pump output is, in this invention, divided between the lubrication system of the transmission 11 and a cooling oil circulating system for the power unit 10 more particularly described hereinafter. The pump 13 has a pressure discharge outlet 14 from which the oil under pressure is delivered into the transmission for circulation of lubricant, and this same oil output is used as the cooling oil for the power unit.

The brake power unit 10 is located between the transmission housing 11 and the housing 15 that contains a conventional universal joint 16 connected with the power output shaft 12 of the transmission 11 by means of a suitable spline connection 17. The universal joint 16 is connected with a conventional propeller shaft for the vehicle which in turn connects with the differential and through the differential with the rear wheels of the vehicle.

The brake power unit 10 consists of a housing or casing 20 through which the output shaft 12 of the transmission 11 extends. One end 21 of the casing 20 receives the pump 13 of the transmission, the pump closing this end of the casing 20. The end wall 22 of the casing 20 carries an anti-friction bearing member 23 that supports the power shaft 12 at that end of the casing.

The power shaft 12 supports a carrier member 25 that is splined to the shaft 12 by a spline connection 26, the carrier 25 being retained in position on the shaft 12 between the anti-friction bearing 23 and a retaining ring 27. The outer periphery of the carrier 25 has a series of teeth or splines 28 that support a plurality of driving discs 29. Thus the discs 29 rotate whenever the shaft 12 rotates.

A second reversibly rotatable carrier member 30 is supported within the casing 20 by means of anti-friction bearings 31 and 32. The anti-friction bearings 31 and 32 being at opposite axial ends of the carrier 30 support the same for freedom of rotation within the casing 20.

The carrier member 30 has a series of teeth or splines 33 that support a plurality of discs 35 adapted to be engaged by the driving discs 29 whereby the discs 35 are driven to rotate the carrier 30 in either direction of rotation depending upon the direction of the rotation of the shaft 12. The carrier 30 has an annular axial projection 36 that has an annular face 37 engaging the annular face 38 of a recess in the casing 20. An annular groove 39 extends inwardly of the annular face 37 of the projection 36 with an oil passage 40 providing connection with the discharge passage 14 of the oil pump 13. Seal members 41 are provided on both sides of the groove 39.

A plurality of passages 42 extend from the annular groove 39 into communication with an oil chamber 43 formed between the carrier 25 and the carrier 30 so that oil conducted through the passages 14 and 40 can circulate between the discs 29 and 35 for cooling of the discs when they are in frictional engagement and rotating relative to one another during a controlled brake application in a manner hereinafter described.

The brake lining facings 45 on each of the driving discs 29 are provided with grooves extending inwardly of the surface of the facings to allow circulation of oil between the driving discs 29 and the driven discs 35 when the driving discs are engaging the driven discs. Oil circulated between the discs 29 and 35 returns to the interior of the casing 10 and thence into the main reservoir sump in the transmission 11.

The carrier 30 has a neutral position at which the brakes of the vehicle are not applied, and when the carrier 30 is in this neutral position a plug or valve member 46 closes the passage 40 to prevent circulation of oil into the chamber 43. However, as soon as the carrier 30 is rotated in either direction of rotation from its neutral position to effect engagement of the driving discs 29 with the driven discs 35, the valve 46 will pass over the opening 40 and allow oil to be circulated into the chamber 43.

The carrier member 30 has a radial cam portion 50 that has a cam face 51, more particularly illustrated in Fig. 3. The cam face 51 is exactly duplicated on diametrically opposite sides of the camp portion 50. The cam face is also divided so that there is a cam face 51 and a cam face 51a on each of two quadrants of the cam 50. Duplicate cam faces 51c and 51d are provided on diametrically opposite quadrants of the cam opposite to cam faces 51 and 51a. The low point of the cam is provided on a radial line between the cam faces 51, 51a and 51c, 51d whereas the high point of the cam is provided on a radial line between the cam faces 51, 51d and 51a, 51c. Diametrically opposite sides of the cam are exactly the same.

Fluid displacement devices 60 and 60a are provided on diametrically opposite sides of the cam 50. Each of the fluid displacement devices 60 or 60a consists of a cylinder 61 that has an axial bore 62 which receives a fluid displacing piston 63. One end of the bore 62 is closed by a closure plug 64 that has a discharge outlet 65 for connection with the hydraulic brake lines of a hydraulic brake system on a motor vehicle. Since the hydraulic brake system may be of conventional type, description of such system is not made herein. A residual check valve 66 is supported upon the closure plug 64 and a compression spring 67 is positioned between the check valve 66 and the forward end of the displacement piston 63, the spring 67 holding the check valve on its seat and retaining the cup seal member 68 against the forward end of the piston 63. The spring 67 also urges the piston 63 in a direction to effect engagement of the roller 70 with the cam surface of the cam 50. Seals 69 and 69' prevent loss of hydraulic fluid from the displacement bore 62 of the cylinder.

The cylinder 62 is connected with a reservoir 71 for hydraulic fluid, a port 72 being provided for passage of fluid from the reservoir into the cylinder when the piston 63 is in the retracted position illustrated in Figure 3. A drip pipe 73 allows any loss of hydraulic fluid from the cylinder 62 to drain from the left hand end of the cylinder bore.

Obviously from the arrangement of the device shown in Figure 3, when the cam 50 rotates in either direction the pistons 63 will be reciprocated in their respective cylinders to effect displacement of hydraulic fluid from the respective cylinder bores 62 through the exhaust ports 65 into the hydraulic brake lines of the hydraulic system for operation of the hydraulic brakes of the vehicle.

If desired one of the fluid displacement devices 60 can supply hydraulic fluid under pressure to the front wheel brakes of a vehicle while the fluid displacement device 60a supplies fluid under pressure to the hydraulic brakes at the rear wheels of the vehicle. On the other hand both fluid displacement devices 60 and 60a can concurrently supply hydraulic fluid to the complete brake system, that is for both front wheels and rear wheels. In this latter event it is preferable to provide a line or passage 75 to provide for equalization of pressure between the displacement bores of the two cylinders 62 and 62a. This equalization line is illustrated in dotted lines as it is of a modified arrangement of the device.

The clutch device consisting of the driving plates 29 and the driven plates 35 is operated by an actuating member 80 at one side by the carrier member 30. The periphery of the actuating member 80 has a plurality of teeth or splines 81 connecting with splines or teeth 82 on the carrier 30 whereby the actuating member 80 is supported on the carrier 30 and rotates with it in either direction of rotation.

Figure 2:
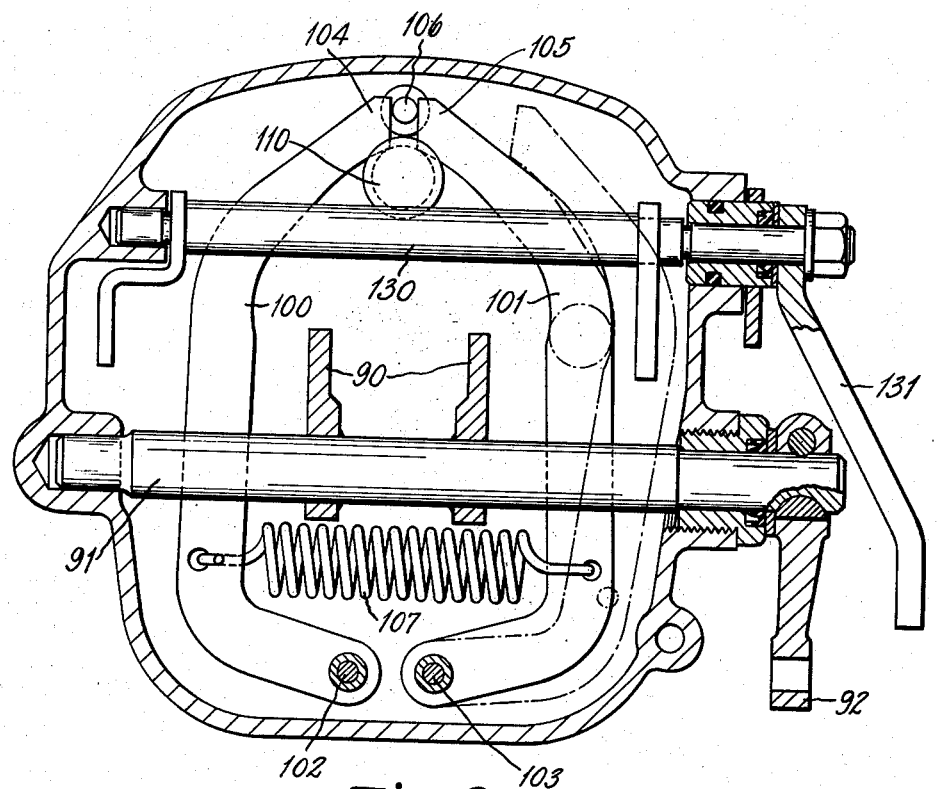
Figure 2 is a transverse cross sectional view taken substantially along line 2—2 of Figure 1.
Figure 4:
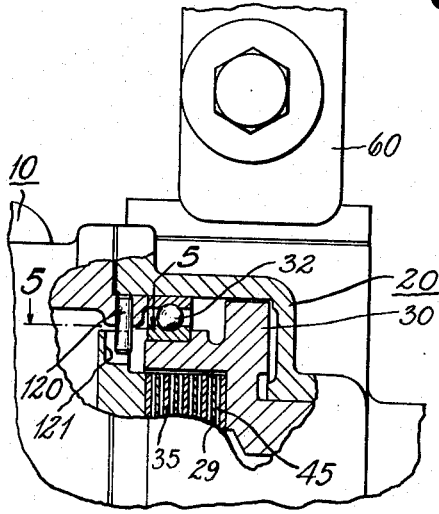
Figure 4 is a partial cross sectional view illustrating a limit stop for the actuating member for the clutching device.

The actuating member 80 supports a sleeve 85 that in turn supports an annular wear member 86. A needle thrust bearing 87 is provided between the wear member 86 and the actuating member 80. The actuating member 80 is moved axially of the shaft 12 and of the discs 29, 35 by means of a manually operated lever 90 that is carried upon a shaft 91 journaled in the casing 10, as illustrated in Figure 2. The shaft 91 carries a lever 92 that in turn is connected mechanically with the brake pedal located within the passenger compartment of the vehicle so as to rotate the shaft 91 when the brake pedal is actuated by the operator of the vehicle.

The carrier 30 together with the cam 50 and the actuating member 80 are normally held in a central or neutral position with the cam positioned as shown in Figure 3 by means of a centering mechanism that consists of a pair of arms 100 and 101 carried on pivot pins 102 and 103 respectively. The upper ends 104 and 105 of the arms engage a stop pin 106, the tension spring 107 normally holding the arms 100 and 101 in the position illustrated in Figure 2.

The actuating member 80 carries a pin or button member 110 disposed between the arms 100 and 101, as shown in Figure 2. When the actuating member 80 is rotated with the carrier 30, the button member engages either arm 100 or 101, depending upon the direction of rotation of the carrier 30 to render the centering means inactive to center the carrier 30 so long as the discs 29 and 35 are in engagement. Whenever the discs 29 and 35 become disengaged, the centering arms 100 and 101 will move the actuating member 80 and the carrier 30 back to center position illustrated in Figure 3, and thereby place the cam 50 in neutral position so that the displacement pistons 63 will be in their fully retracted positions.

From the foregoing description it will be apparent that so long as the shaft 12 rotates in either direction of rotation a source of power will be available for operation of the power unit. When the brake application is to be made by the operator of the vehicle, the shaft 91 is rotated through a mechanical linkage that is connected with the lever 92 to rotate the lever 90 in a clockwise direction, as viewed in Figure 1. This movement of lever 90 urges the wear ring 86 and the actuator member 80 in a right hand direction to effect engagement of the driven discs 35 with the driving discs 29 that are constantly rotating with the shaft 12.

When the driving discs 29 engage the driven discs 35 the carrier member 30 together with the cam 50 will be rotated either clockwise or counter-clockwise depending upon the direction of rotation of the shaft 12 to rotate the cam 50 from the position illustrated in Fig. 3 toward a position 90° from that shown in Figure 3. This will effect reciprocation of the pistons 63 in the cylinder 61 to cause displacement of hydraulic fluid into the brake lines of the motor vehicle and thereby actuate the hydraulic brakes.

The degree of brake application will be governed by the degree of force applied to the actuating member 80 to effect engagement of the discs 29 and 35. It will be understood that while the discs 29 continuously rotate, when the discs 29 and 35 are brought into engagement there will be slippage between the discs, but sufficient drag is made upon the driven discs 35 by the driving discs 29 to rotate the carrier 30 and the cam 50 therewith.

Figure 5:
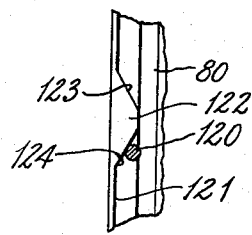
Figure 5 is a partial cross sectional view of the limit stop of Figure 4 taken along line 5—5 of Figure 4.

To prevent the cam 50 from throwing over center on any brake application, even in the event of a panic stop, a stop pin 120 rides in an annular recess 121 in the actuating member 80 that is connected with carrier 30. A cam shaped boss 122 having cam faces 123 and 124 (see Figure 5) engage the stop pin 120, depending upon the direction of rotation of the member 80 so that when the high point of the cam 50 approaches alignment with the axis of the pistons 63 the member 80 will be moved in a left hand direction as viewed in Figure 1 to effect disengagement of the discs 29 and 35. Thus, at no time can more than the predetermined maximum movement be applied to the pistons 63 to thereby limit the brake effort applied by the hydraulic brakes, and the cam 50 will at all times be prevented from throwing over center.

Shaft 130 and lever arm 131 are a part of the gear shift mechanism of the transmission and are thus not further described herein.

While the form of embodiment of the invention as herein disclosed constitutes a preferred form, it is to be understood that other forms might be adopted as may come within the scope of the claims which follow.

What is claimed is as follows:

1. A power unit adapted for operation of vehicle brakes, comprising, a rotatable power shaft, fluid displacement means including cylinder and piston means therein for delivery of hydraulic fluid under pressure to a hydraulic brake system, a clutch device comprising first driving disc means carried on said shaft and continuously rotatable therewith and second driven disc means engageable with said first disc means for intermittent driven rotation thereby, reversibly rotatable carrier means supporting said driven disc means, said carrier means having cam means thereon engaging said piston means for reciprocable movement of the piston means on rotation of the carrier means in either direction, disc actuating means movable axially of the discs to effect their engagement and engaging said carrier means for rotation therewith, centering means engaging said disc actuating means positioning said carrier means normally with said cam means in a neutral position from which rotation of the cam means in either direction will effect reciprocation of said piston means, pump means for effecting liquid flow driven by said shaft, means forming passage means for delivering liquid from said pump to said discs for circulation between the discs, valve means in said passage means, said valve means formed integral with said carrier to provide opening of said passage means upon rotation of said carrier, and manually operable lever means engaging said disc actuating means to operate the same to effect engagement of the said discs.

2. A power unit adapted for operation of vehicle brakes, comprising, a rotatable power shaft, fluid displacement means including cylinder and piston means therein for delivery of hydraulic fluid under pressure to a hydraulic brake system, a clutch device comprising first driving disc means carried on said shaft and continuously rotatable therewith and second driven disc means engageable with said first disc means for intermittent driven rotation thereby, reversibly rotatable carrier means supporting said driven disc means, said carrier means having cam means thereon engaging said piston means for reciprocable movement of the piston means on rotation of the carrier means in either direction, disc actuating means movable axially of the discs to effect their engagement and engaging said carrier means for rotation therewith, centering means engaging said disc actuating means positioning said carrier means normally with said cam means in a neutral position from which rotation of the cam means in either direction will effect reciprocation of said piston means, pump means for effecting liquid flow driven by said shaft, means forming passage means for delivery of liquid from said pump to said discs for circulation between the discs, valve means in said passage means actuated by said carrier to stop liquid flow to said discs when said carrier is in said neutral position, and manually operable lever means engaging said disc actuating means to operate the same of the said discs.

3. A power unit adapted for operation of vehicle brakes, comprising, a rotatable power shaft, fluid displacement means including cylinder and piston means therein for delivery of hydraulic fluid under pressure to a hydraulic brake system, a clutch device comprising first driving disc means carried on said shaft and continuously rotatable therewith and second driven disc means engageable with said first disc means for intermittent driven rotation thereby, reversibly rotatable carrier means supporting said driven disc means, said carrier means having cam means thereon engaging said piston means for reciprocable movement of the piston means on rotation of the carrier means in either direction, disc actuating means movable axially of the discs to effect their engagement and engaging said carrier means for rotation therewith, centering means engaging said disc actuating means positioning said carrier means normally with said cam means in a neutral position from which rotation of the cam means in either direction will effect reciprocation of said piston means, and means engaged by said disc actuating means on rotation thereof to a position at which the cam means approaches maximum throw in effecting movement of said piston to move said disc actuating means axially and effect disengagement thereof.

4. A power unit adapted for operation of vehicle brakes, comprising, a rotatable power shaft, fluid displacement means including cylinder and piston means therein for delivery of hydraulic fluid under pressure to a hydraulic brake system, a clutch device comprising first driving disc means carried on said shaft and continuously rotatable therewith and second driven disc means engageable with said first disc means for intermittent driven rotation thereby, reversibly rotatable carrier means supporting said driven disc means, said carrier means having cam means thereon engaging said piston means for reciprocable movement of the piston means on rotation of the carrier means in either direction, disc actuating means movable axially of the discs to effect their engagement and engaging said carrier means for rotation therewith, centering means engaging said disc actuating means positioning said carrier means normally with said cam means in a neutral position from which rotation of the cam means in either direction will effect reciprocation of said piston means, and means engaged by said disk actuating means on rotation thereof in either direction a predetermined amount to effect disengagement of said disks and thereby limit rotation of said cam means.

5. A power unit adapted for operation of vehicle brakes, comprising, a rotatable power shaft, fluid displacement means including cylinder and piston means therein for delivery of hydraulic fluid under pressure to a hydraulic brake system, a clutch device comprising first driving disc means supported upon a first carrier carried on said shaft and continuously rotatable therewith and second driven disc means supported upon a reversibly rotatable carrier means supporting said driven disc means, said driven disc means being engageable with said driving disc means for intermittent driven rotation of the driven disc means, said first and second carrier means having a chamber formed therebetween to receive fluid for circulation between the disc means, said reversibly rotatable carrier means having cam means thereon engaging said piston means for reciprocable movement of the piston means on rotation of the reversibly rotatable carrier means in either direction, disc actuating means engaging said disc carrier means and movable axially of the discs to effect their engagement, centering means engaging said disc actuating means positioning said carrier means normally with said cam means in a neutral position from which rotation of the cam means in either direction will effect reciprocation of said piston means, manually operable lever means engaging said disc actuating means to operate the same to effect engagement of said discs, pump means for effecting liquid flow driven by said shaft, means forming passage means for delivery of liquid from said pump to said chamber for circulation between the discs, and valve means in said passage means actuated by said reversibly rotatable carrier means to stop liquid flow to said chamber when said reversibly rotatable carrier means is in said neutral position.

References Cited in the file of this patent

UNITED STATES PATENTS

| | | |
|---|---|---|
| 2,201,086 | Guderian | May 14, 1940 |
| 2,206,976 | Rossmann | July 9, 1940 |
| 2,258,855 | La Brie | Oct. 14, 1941 |
| 2,498,123 | Hobbs | Feb. 21, 1950 |
| 2,633,220 | Chase | Mar. 31, 1953 |
| 2,788,870 | Heck | Apr. 16, 1957 |

FOREIGN PATENTS

| | | |
|---|---|---|
| 331,735 | Germany | June 3, 1921 |